Figure 1:
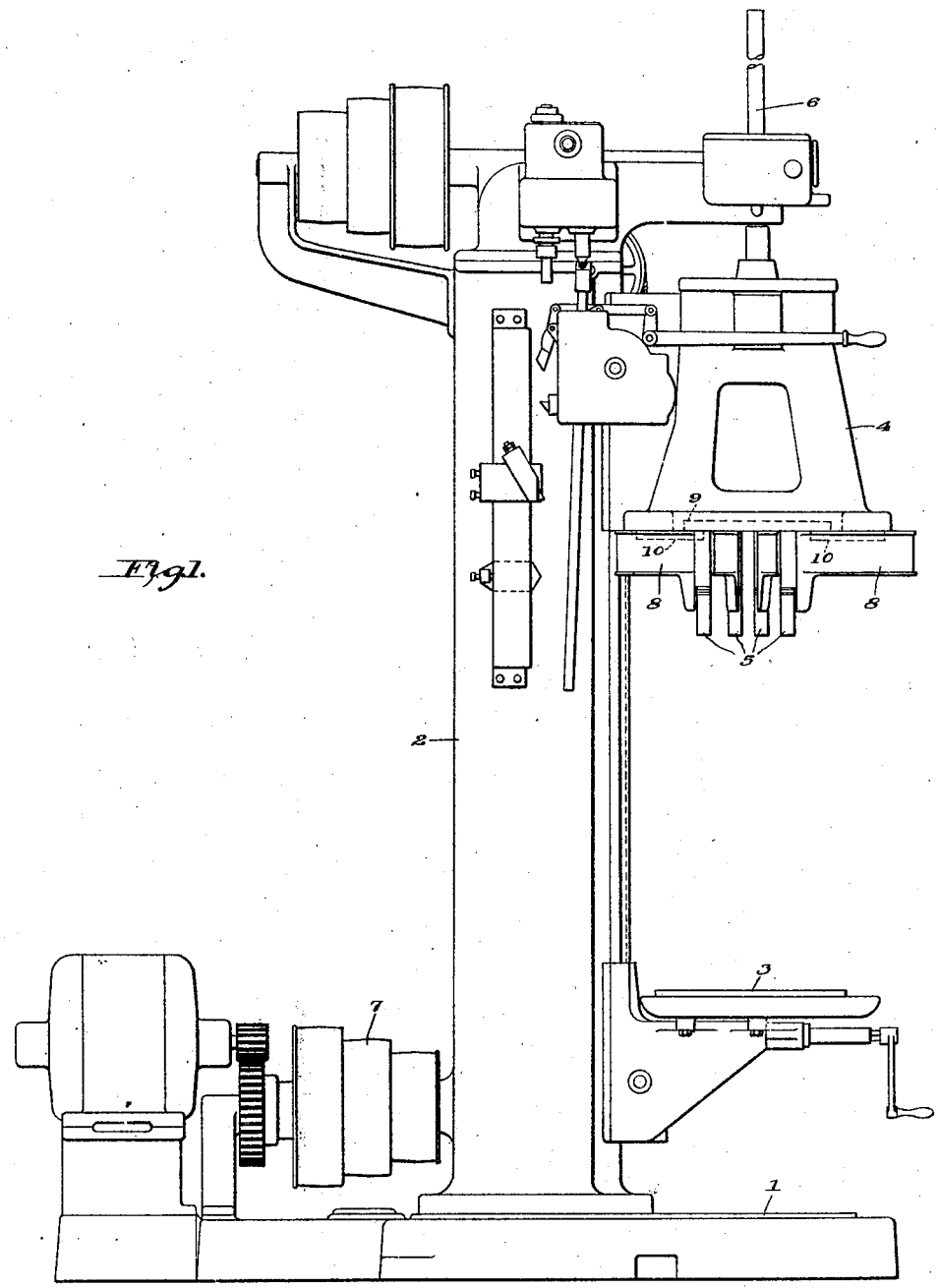

Feb. 28, 1928.  
F. J. PETERS.  
1,660,353  
INTERCHANGEABLE DOWELED ARM  
Filed Aug. 24, 1925  
2 Sheets-Sheet 2

Inventor  
Frebut J. Peters  
By Attorney  
Albert F. Nathan

Patented Feb. 28, 1928.

1,660,353

UNITED STATES PATENT OFFICE.

FREBERT J. PETERS, OF RICHMOND, INDIANA, ASSIGNOR TO THE NATIONAL AUTOMATIC TOOL COMPANY, OF RICHMOND, INDIANA, A CORPORATION OF INDIANA.

INTERCHANGEABLE DOWELED ARM.

Application filed August 24, 1925. Serial No. 52,045.

My invention relates to machine tools having a head provided with a plurality of adjustable cutting tools and is concerned particularly with the arms used in positioning and holding the cutting tools in a predetermined relation.

In a multiple drilling or tapping machine a plurality of rotating cutting tools, as for example drills, are carried by a movable drill head. The drills are positioned and held in a predetermined relation with respect to each other in order to drill holes in a predetermined arrangement. The drills are carried by spindles which in turn are carried by spindle bearings. The spindle bearings are connected to spindle arms which in turn are secured either to the drill head directly or to a cluster plate on the drill head.

One of the principal features of my invention is to provide improved interchangeable spindle arms which are secured to the cluster plate in an improved manner. The arms, which are constructed in accordance with my invention, are similarly constructed in order to be interchangeable. Moreover the arms are not only provided with means for securely clamping them to a cluster plate but are also provided with means for insuring against any movement by them on the cluster plate during a drilling operation.

In a multiple drilling machine constructed in accordance with my invention the spindle arms are secured to the cluster plate by means of clamping bolts. Furthermore, dowel pins are provided between the arms and the cluster plate for accurately locating the arms and the drills connected thereto and for insuring against any movement of the arms during a drilling operation. The cluster plate is, in accordance with usual practice, secured to the bottom of the drill head by means of suitable clamps. The arms, which are clamped to the cluster plate, are suitably bolted to the spindle bearings which support the drill spindles. Each of the arms is provided with an upper and lower rib having suitable supporting means between them. The top rib has two dowel pin holes formed therein, one dowel pin hole being located at the side of the arm and the other dowel pin hole preferably being located at the end of the arm. Such dowel pin holes are similarly located in all the arms so that the dowel pin holes not only bear the same relation to each other but also bear the same relation to the center of the drill which is carried by the arm. Inasmuch as the dowel pin holes are similarly placed, as above set forth, it is apparent the arms are interchangeable. In the lower rib two guide holes are formed in alignment with the two dowel pin holes in the upper rib. The guide holes co-operate with the dowel pin holes for guiding tools to form dowel pin holes in the cluster plate. When the dowel pin holes are formed in the cluster plate it is apparent the setup of the number of drills may be effected quickly and accurately by means of the dowel pin connection between the arms and the cluster plate. Moreover it is apparent that the arms and drill are accurately held in position after once having been set. The arms are provided with clamping slots through which stud bolts, secured to the plate, project.

Preferably the dowel pins are held in the arms and not in the plate. When the dowel pins are secured in the arms it is much easier to change the arms from one setup to a second setup. The stud bolts, which clamp the arms to the plate, are preferably secured to the plate.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure, and, in such drawings, like characters of reference denote corresponding parts throughout all the views, of which:—

Figure 2:
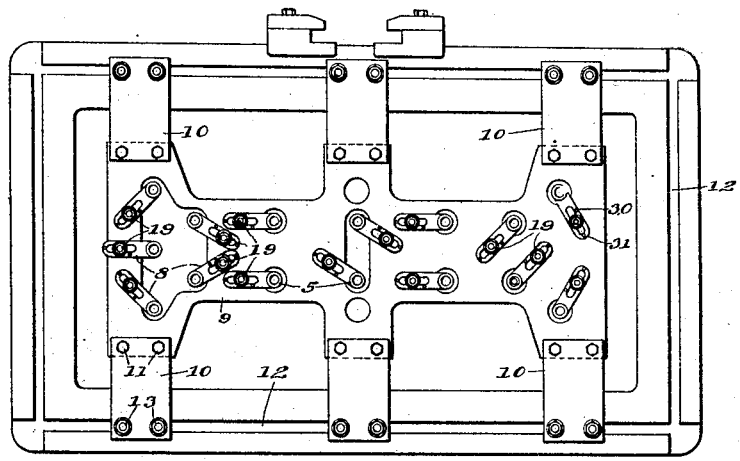
Figure 3:
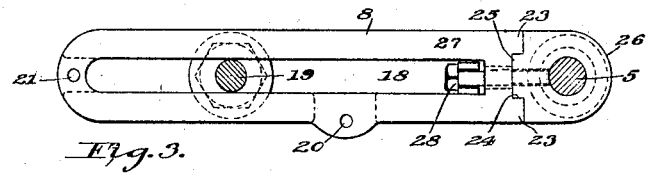
Figure 4:
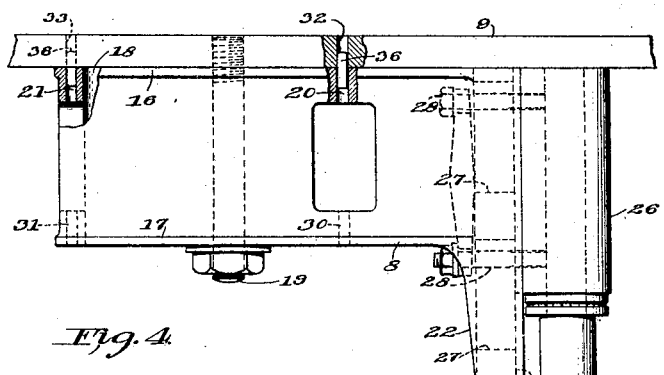

Figure 1 is an elevational view showing a drill head having arms connected thereto which are constructed in accordance with my invention. Fig. 2 is a bottom plan view of the drill head shown in Fig. 1. Fig. 3 is a plan view of a spindle arm constructed in accordance with my invention. Fig. 4 is an elevational view of the spindle arm shown in Fig. 3.

Referring to the drawings and particularly to Figs. 1 and 2, a multiple drill is illustrated comprising a base 1 having an upright 2 supported thereon. The upright 2 carries a work table 3 and a movable drill head 4. The drill head 4 is moved along the upright 2 in any suitable manner and carries a plurality of the drill spindles 5. The drill spindles 5 carry suitable drilling tools not illustrated. The spindles 5 are rotated by means of a shaft 6 which is connected in any suitable manner through gearing to a main driving pulley 7. Inasmuch as my invention is not particularly related to the means for driving the shaft 6 and to the connecting means between the shaft 6 and the spindles 5 a detailed description of such mechanism will not be set forth.

The spindles 5 are held in various arrangements by means of spindle arms 8. The spindle arms, in some cases, may be secured directly to the drill head 4 by means of clamping bolts. However, in a very complicated arrangement of the drills and where the overhang of the arms would be very much if connected to the drill head, it is necessary to provide a cluster plate such as a cluster plate 9 shown in Fig. 2 of the drawings. The cluster plate is secured to the bottom of the drill head 4 in any suitable manner and in Fig. 2 is illustrated as connected to the drill head by means of clamps 10. The clamps 10 are secured to the cluster plate by means of bolts 11 and are connected to T slots 12 in the bottom of the drill head by means of T bolts 13.

Referring to Figs. 3 and 4 of the drawings a clamping arm is shown comprising a top rib 16 and a bottom rib 17. The two ribs are joined together and preferably are formed integral (as shown in the drawings). A slot 18 is formed in the center of the arm for receiving a stud bolt 19, as shown in Figs. 2 and 3 of the drawings. The stud bolts are preferably threadably secured to the selector plate. One bolt 19 is shown threadably secured to the plate 9 in Fig. 4 of the drawings. The bolts may be removed from the plate when desired. The top rib 16 is provided with a dowel pin hole 20 in the side thereof, and a dowel pin hole 21 in the end thereof. The two dowel pin holes 20 and 21 in each of the spindle arms are accurately located with respect to each other and with respect to the drill which is carried by the arm. By constructing the arms similarly in all respects and accurately locating the dowel pin holes 20 and 21 the arms are interchangeable. The base or support 22 for the arm is provided with two projections 23 which form a groove 24 there-between. The groove 24 is fitted to a projection 25 on a spindle bearing 26. A slot 27 is formed through the base 22 of the arm, as shown in Fig. 3, for receiving suitable bolts 28. The bolts 28 are threadably connected to the spindle bearings and serve to clamp the arms securely in position. The spindle bearings 26, as above set forth, carry the drill spindles 5.

A dowel pin 36 is secured in each hole 20 and a second dowel pin 36 is secured in each hole 21. The dowel pins 36 and 36 are secured in the arm and not in the plate to assist in changing from one setup to a second setup. When the arm is used as a jig in forming dowel pin holes in a selector plate the pins may be removed.

The bottom rib 17 has two guide holes 30 and 31 formed therein which are in alignment with the dowel pin holes 20 and 21 formed in the upper rib 16. The guide holes 30 and 31 in combination with the dowel pin holes 20 and 21 serve as guiding means for tools in forming dowel pin holes in the cluster plate. The spindle arms are constructed exactly alike and have the dowel pin holes and the guide holes similarly placed. Such spindle arms are interchangeable and may be attached to the bearing spindle and be used as a guiding means for forming dowel pin holes in the cluster plate. The clamping bolts 19 do not need to be secured in the cluster plate with the accuracy required in forming the dowel pin holes 32 and 33. The slots 18 in the arms permit a limited adjustment of the arms with respect to the bolts. Upon completion of the dowel pin holes 32 and 33 in the cluster plate it is apparent that a particular setup, as indicated by the cluster plate, may be effected very quickly by simply doweling the spindle arms of the cluster plate and clamping them in position by the bolts 19. In this regard it should be noted the spindle arms are completely interchangeable and no particular arm need be used with each spindle.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:—

1. In a machine tool, an arm providing a bearing for a spindle and having a top and a bottom rib, two dowel pin holes respectively formed in the side and the end of the top rib, a slot formed in the arm for receiving a clamping bolt, and guide holes formed in the lower rib in alignment with the two dowel pin holes in the top rib.

2. In a machine tool an arm providing a bearing for a spindle and having spaced portions a plurality of spaced dowel pin holes in one of said portions; a corresponding plurality of guide holes in the other portion in alignment respectively with said dowel pin holes; and a slot formed in the spindle arm for receiving a clamping bolt.

3. A machine tool combining a head; a plurality of spindles carried by said head; a cluster plate adapted to be secured to said head; and a plurality of interchangeable spindle arms each providing a bearing for securing one of said spindles to said plate, each of said arms comprising spaced portions, a plurality of spaced dowel pin holes in one of said portions and similarly positioned in the respective arms, corresponding guide holes in the other of said portions aligned respectively with the dowel pin holes, and a slot formed in the spindle arm adapted to receive a clamping bolt for securing the arm to the cluster plate.

4. In a machine tool having a plurality of spindles carried by a head and adapted to be secured to a cluster plate mounted on the head, a spindle arm providing a bearing for securing each spindle to the cluster plate and having a top and a bottom rib, said ribs having a slot formed therein for receiving a clamping bolt, two dowel pin holes being formed in one of said ribs and two guiding holes being formed in the other rib and aligned with the dowel pin holes.

5. In a machine tool having a plurality of spindles adapted to be secured to a cluster plate on a head, a plurality of interchangeable spindle arms each providing a bearing for securing the spindles to the cluster plate, each of said arms having similarly positioned holes on the side and the end thereof for receiving dowel pins, two guide holes being formed in each arm in spaced relation and in alignment with said dowel pin holes, and a slot formed in said arm for receiving a clamping bolt.

6. In a machine tool having a plurality of spindles adapted to be secured to a cluster plate on a head, a plurality of interchangeable spindle arms providing bearings for securing the spindles to the cluster plate in a predetermined arrangement, each of said arms having two ribs with two dowel pin holes formed in one rib and two guide holes formed in the other rib in alignment with the dowel pin holes, the dowel pin holes in the arms being similarly positioned to permit the interchanging of the arms and the dowel pin holes with the guide holes serving as guiding means for forming dowel pin holes in the cluster plate.

7. In a machine tool having a plurality of spindles adapted to be secured to a cluster plate on a head; a plurality of interchangeable spindle arms providing bearings for securing the spindle to the cluster plate in a predetermined arrangement, each of said arms having two ribs with connecting means between the ribs, the upper rib having two dowel pin holes respectively formed in the side and the end thereof, two guide holes formed in the other rib in alignment with the dowel pin holes, the dowel pin holes in the arms being similarly positioned to permit the interchanging of the arms, the dowel pin holes with the guide holes serving as guiding means for forming dowel pin holes in the cluster plate, and a slot formed in the arm for receiving a clamping bolt.

In witness whereof, I have hereunto subscribed my name.

FREBERT J. PETERS.